June 26, 1956

J. WIRGIN 2,751,828

LENS TUBE FOR SINGLE LENS REFLEX CAMERAS

Filed May 20, 1954

INVENTOR
JOSEPH WIRGIN

BY Burgess & Dinklage

ATTORNEY

United States Patent Office 2,751,828
Patented June 26, 1956

2,751,828
LENS TUBE FOR SINGLE LENS REFLEX CAMERAS

Joseph Wirgin, Mount Vernon, N. Y.

Application May 20, 1954, Serial No. 431,017

1 Claim. (Cl. 95—64)

This invention relates to a lens tube for a single lens reflex camera. It more particularly relates to a lens tube for use with a single lens reflex camera provided with an automatic preset diaphragm.

The invention and its objections will be fully understood from the following description read in conjunction with the drawing in which.

In single lens reflex cameras, a swingable, inclined mirror reflecting surface is positioned in back of the lens so that the image from the lens is projected upward on a viewing screen of ground glass or the like or through a viewing objective. The viewing screen may be shielded by a hood through which the photographer observes the image. As a reflecting surface of the mirror is positioned equidistant from the viewing screen and from the film, the exact image which will strike the film is seen on the viewing screen and exact viewing without parallax and accurate focusing may be effected in this manner.

Single reflex cameras are generally provided with focal plane shutters positioned in front of the film behind the mirror. As the picture is snapped, the mirror flips up over the viewing screen and the focal plane shutter is actuated across the film.

Since the same lens is used for taking the exposure as for viewing and focusing, it is necessary to set this lens to the correct aperture prior to the taking of the picture.

Depending upon the light conditions, the film speed and the shutter speed used, the lens aperture used for taking the exposure is often much smaller than the maximum aperture available on the lens. Thus, for example, to increase the depth of field, it is often desirable to set the lens to the smallest aperture permissible depending on light conditions, etc.

For focusing and viewing, however, it is always desirable to maintain the lens at its maximum aperture since the stopping down of the lens dims the image on the viewing screen making the picture hard to compose and focus.

In order, in a single lens reflex camera, to allow viewing at the maximum aperture and making the exposure at the aperture desired, the "preset diaphragm" has been developed. The automatic preset diaphragm allows the lens to be set to any desired F number; focused at the maximum aperture and automatically as the picture is snapped, the lens will shut down to this preset aperture opening. Thus, for example, an F1.9 lens with a preset diaphragm may be preset at F16; focusing may be effected at the maximum aperture F1.9 and as the picture is snapped, the diaphragm will stop down to F16 prior to actuation of the shutter.

Figure 1:
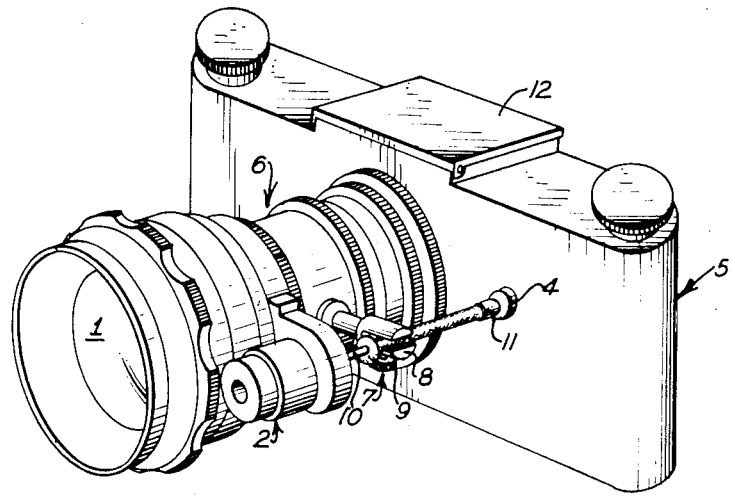
Fig. 1 is a perspective view of an embodiment of a lens tube in accordance with the invention shown in use in connection with a reflex camera.

As shown in Fig. 1, the camera 5 has the shutter release or exposure button 4 which is depressed to effect the exposure. The lens 1 with the preset mechanism 2 is generally connected directly to the camera without the lens or extension tube 6 so that the preset release mechanism abuts against the shutter release mechanism 4. The lens 1 may be set to any desired aperture opening below its maximum aperture opening and as the button 2 is depressed, the diaphragm will automatically close to this preset aperture. A member 3 is connected to the button 2 and will extend rearwardly as the button 2 is pressed. This finger 3 will normally depress the shutter release button 4 so that after button 2 has stopped the diaphragm of the lens 1 to the preset opening, the same automatically releases the shutter by depressing the shutter release 4. Upon release of the button 2, the lens diaphragm again opens to its maximum aperture.

The diaphragm of the lens is generally positioned between the lens elements and the preset mechanism must be positioned adjacent thereto. When using the lens with an extension tube as, for example, for closeup work or when using lenses such as telephoto lenses with relatively long lens tubes, the automatic preset mechanism cannot be used since the preset button with its member 3 would not abut the shutter release button 4 of the camera. In such cases, the preset mechanism had to be dispensed with and the lens had to be set down to the desired aperture by hand either before focusing of after focusing and before the exposure. This, of course, eliminated the benefits of the automatic preset mechanism in these cases.

In accordance with the invention, a lens tube or extension which will generically be referred to herein as a lens tube extension is provided which allows the use of the automatic preset diaphragm mechanism.

The lens tube 6, in accordance with the invention, is provided with a member 7 to which means may be attached for actuating the shutter release button 4 of the camera by means of the preset diaphragm mechanism button 2 of the lens.

Figure 2:
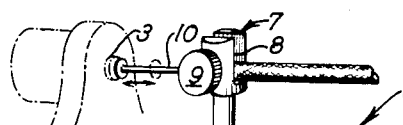
Fig. 2 is a perspective view of the lens tube shown in Fig. 1.

In the embodiments as shown in Figs. 1 and 2, the lens tube 6 is provided with the upright post member 7 which has a clamp 8 at its end. A standard cable release may be clamped in clamp 8 by means of the set screw 9 so that its finger button portion 10 abuts against the member 3 of the preset mechanism in the same manner as the finger button 4 when the lens 1 is positioned directly on the camera. The other end of the cable release 11 is screwed into the shutter release button 4 in the conventional manner.

In operation, the lens 1 is preset down to the desired aperture opening. The camera is set up for the exposure and the image is viewed on the viewing screen through the hood 12. To make the exposure, the button 2 is pressed which automatically stops down the diaphragm of the lens 1 to the aperture preset. As button 2 is depressed, the member 3 extends depressing the finger button 10 of the cable release which is turn releases the shutter mechanism of the camera through the button 4 making the exposure.

Figure 3:
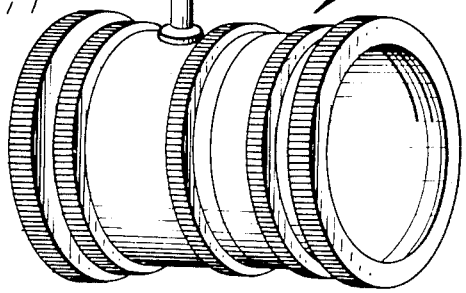
Fig. 3 is a partial side elevation of a different embodiment of a lens tube in accordance with the invention.

In place of the clamp 8 for holding the cable release, the member 7 or a pair of members 7 as shown in Fig. 3, may be provided with the slide bearings 13 through which the rod 14 slidably extends. The rod 14 makes a direct linkage from the member 3 to the button 4.

While the invention has been described in detail, with reference to the embodiments shown, variations and modifications which fall within the spirit of the invention and the scope of the appended claim will become apparent to the skilled artisan.

I claim:

A lens tube extension for use in combination with a single lens reflex camera and a lens therefor provided with an automatic pre-set diaphragm mechanism comprising an open-ended hollow extension tube having means at one end thereof for connection to a camera, and means at the other end thereof for connection of a lens thereto, a post connected rigidly to and extending radially from the outer surface of said tube, a forked shaped member positioned at the end of said post defining a slot for a cable release therethrough extending in the axial direction of said tube, and a set screw extending through one side of said forked shaped member for securing a cable release in said slot.

References Cited in the file of this patent

UNITED STATES PATENTS

| 1,791,112 | Azarraga | Feb. 3, 1931 |
| 1,866,588 | Warren | July 12, 1932 |
| 1,951,264 | Barnack | Mar. 13, 1934 |
| 2,041,633 | Barnack | May 19, 1936 |
| 2,282,291 | Whitman | May 5, 1942 |

FOREIGN PATENTS

| 599,981 | Germany | July 12, 1934 |
| 957,342 | France | Aug. 22, 1949 |